United States Patent [19]

Conner, Jr.

[11] 4,063,238

[45] Dec. 13, 1977

[54] RANGE TRACKING APPARATUS IN A DOPPLER RADAR

[75] Inventor: Leo Buffington Conner, Jr., Phoenix, Ariz.

[73] Assignee: Motorola, Inc., Schaumburg, Ill.

[21] Appl. No.: 686,429

[22] Filed: May 14, 1976

[51] Int. Cl.² ............................................. G01S 9/06
[52] U.S. Cl. ................................. 343/7.3; 343/5 DP
[58] Field of Search ......................... 343/7.3, 9, 5 DP

[56] References Cited
U.S. PATENT DOCUMENTS

| | | | |
|---|---|---|---|
| 3,056,128 | 9/1962 | Ball et al. | 343/7.3 |
| 3,383,681 | 5/1968 | Bryant | 343/9 |
| 3,875,549 | 4/1975 | Stenersen et al. | 343/7.5 |

*Primary Examiner*—Maynard R. Wilbur
*Assistant Examiner*—Lawrence Goodwin
*Attorney, Agent, or Firm*—Eugene A. Parsons

[57] ABSTRACT

A first variable tracking gate is generated which activates a sample and hold circuit connected to receive incoming signals from a doppler radar receiver and apply output signals therefrom to a threshold circuit which in turn supplies a signal to a range counter each time the signal from the sample and hold circuit exceeds a predetermined threshold, whereupon an output from the range counter decreases the range at which the tracking gate is generated. A second tracking gate, generated a short time after the beginning of the first tracking gate, activates a second sample and hold circuit connected to receive signals from the radar receiver and supplies signals through a second threshold circuit to the range counter to increase the range of the first gate when the signal from the second sample and hold exceeds a predetermined threshold and signals from the first sample and hold circuit are below the predetermined threshold.

15 Claims, 5 Drawing Figures

RANGE TRACKING APPARATUS IN A DOPPLER RADAR

BACKGROUND OF THE INVENTION

The present invention pertains to doppler radars including a transmitter which periodically transmits pulses of electrical energy and a receiver which receives reflected portions of the energy of the transmitted pulses and removes the carrier so that only the change of frequency is available. The signal which is provided by the receiver is referred to in the art as a bipolar video, or reflected, pulse train. In prior art range tracking apparatus the bipolar video pulse train is sampled by a circuit which is controlled by a range gate and the sampled signals are detected and filtered, after which they are used as part of an error signal in a conventional servo loop to control the position of the range gate. The major problem with this system is that the loop becomes unstable if the filter time constants are reduced too far. However, the large time constants of the prior art systems cause range errors which are largely dependent on the velocity or acceleration of targets. It is extremely difficult to design a servo loop which can accurately track wide variations of range, velocity and acceleration, such as missiles passing close to the radar vehicle. Further, the prior art systems are relatively complicated and expensive to produce.

SUMMARY OF THE INVENTION

The present invention pertains to range tracking apparatus in a pulse doppler radar wherein sample and hold means are connected to the radar receiver to provide a doppler signal, which doppler signal is applied to threshold means that apply a signal to range counter means each time the doppler signal exceeds a predetermined threshold and the range counter means control the range position of a gate applied to activate the sample and hold means.

In an embodiment of the present invention, in addition to the above noted apparatus, a second range tracking gate is provided a short time after the start of the first range tracking gate and the second range tracking gate activates a second sample and hold means which supplies a second doppler signal through threshold means to a range counter each time the second doppler signal exceeds a predetermined threshold and the range counter reduces the range of the first gate when the first threshold means applies a signal thereto and increases the range of the first gate when the second threshold means applies a signal thereto with no signal output from the first threshold means.

It is an object of the present invention to provide improved range tracking apparatus for a doppler radar.

It is a further object of the present invention to provide range tracking apparatus for a pulse doppler radar wherein the range of a tracking gate is changed in discrete steps in accordance with the position of the range gate relative to the leading edge of the doppler signal.

These and other objects of this invention will become apparent to those skilled in the art upon consideration of the accompanying specification, claims and drawings.

DESCRIPTION OF THE PREFERRED EMBODIMENT

Figure 1:
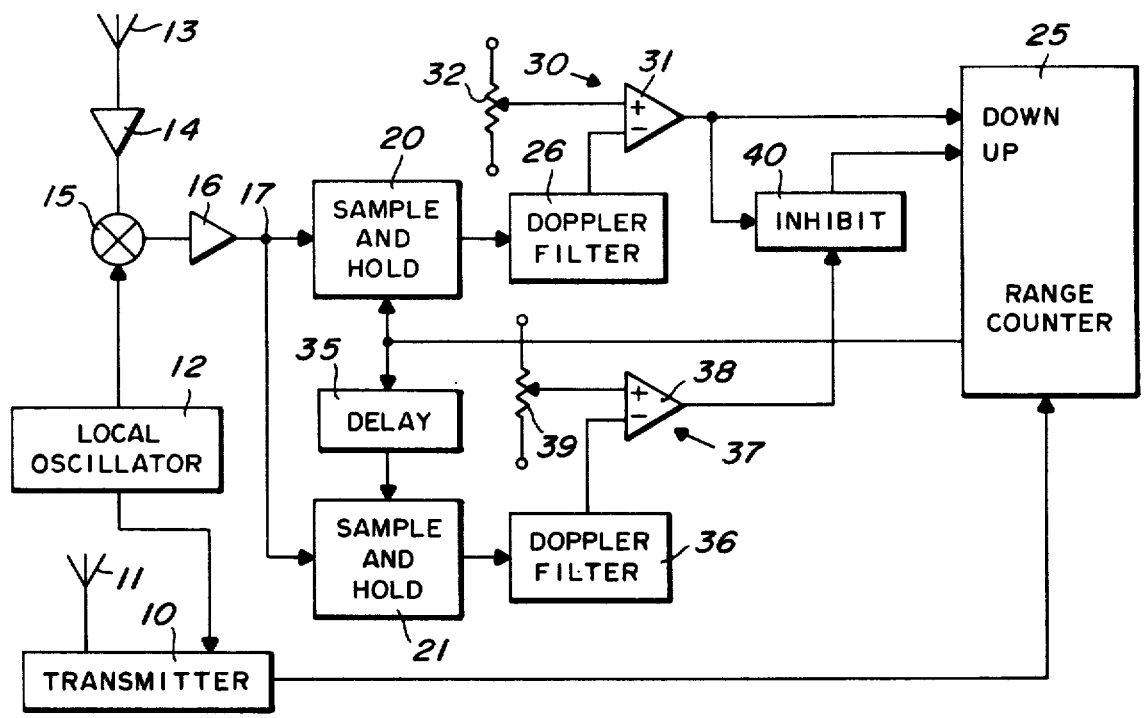
FIG. 1 is a simplified block diagram of a doppler radar including an embodiment of the present invention, and FIGS. 2(a), (b), (c) and (d) illustrate various conditions which the tracking apparatus will experience.

Referring specifically to FIG. 1, a doppler radar transmitter 10 periodically supplies pulses of RF energy to an antenna 11. The frequency of the RF pulses is controlled by a local oscillator 12, which is connected to the transmitter 10. When the pulses of energy transmitted by the antenna 11 are reflected from a moving object, portions of the reflected energy are received by an antenna 13 and supplied to an RF amplifier 14. The signals from the RF amplifer 14 are applied to a mixer 15 and mixed with a signal from the local oscillator 12 to remove the RF and provide an output signal having a frequency proportional to the speed of the target. This signal, which is a train of video or reflected pulses, is amplified in a video amplifier 16 and the amplified signal is available at an output terminal 17. The operation of a pulse doppler radar is well known to those skilled in the art and is illustrated here in very simplified block form only to place the present invention in the proper environment. It will further be understood by those skilled in the art that many variations and alterations of the foregoing are, or may become, available.

The output of the video amplifier 16 at the terminal 17 is applied to inputs of a first sample and hold circuit 20 and a second sample and hold circuit 21. The sample and hold circuit 20 is activated by a range tracking gate which is applied to a gating signal input thereof from a range counter 25. The range counter 25 receives a signal from the transmitter 10 which is indicative of the pulse repetition rate of the transmitter 10 and one tracking gate is produced by the range counter 25 for each pulse of energy transmitted by the transmitter 10. The range tracking gate is produced at some time subsequent to the associated transmitter pulse, which time is dependent upon a setting or count stored in the range counter 25. Initially, the tracking gate supplied to the sample and hold circuit 20 may be produced at some preset value, for example near the outer most end of the range of the doppler radar.

The signals supplied to the sample and hold circuit 20 from the video amplifier 16 are sampled once for each tracking gate applied to the sample and hold circuit 20. It should be understood that, generally, the repetition rate of the transmitter 10 will be high compared to the signal supplied by the video amplifier 16 so that the sample and hold circuit 20 will sample each cycle a plurality of times. The output signal from the sample and hold circuit 20 is applied through a doppler filter 26, which is in general a low pass filter, and the doppler signal available at the output of the filter 26 is applied to one input of a threshold circuit, generally designated 30. In the present embodiment, the threshold circuit 30 includes a comparator 31 and a variable feedback resistor 32, which operates to set the threshold of the circuit. The resistor 32 is connected between fixed power voltage (not shown) and a second input of the comparator 31 so that the output of the doppler filter 26 is always compared to the threshold set by the resistor 32. When the signal at the output of the doppler filter 26 exceeds the predetermined threshold voltage applied to the comparator 31, a signal or pulse is applied to one input of the range counter 25. The range counter 25 generally includes an up/down counter and the output from the threshold circuit 30 is applied to the down input so that each time a pulse is received from the threshold circuit 30 the range counter 25 reduces the range of the tracking gate applied to the sample and hold circuit 20 by one increment. The increments or steps of range through which the tracking gate applied to the sample and hold circuit 20 is controlled are sufficiently small so that no loss of accuracy of the doppler radar is noticeable as compared to a prior art continuous tracking conventional servo loop.

The gate from the range counter 25 is also applied through a delay circuit 35 to a gating signal input of the second sample and hold circuit 21. The output signal from the sample and hold circuit 21 is applied through a second doppler filter 36 to an input of a threshold circuit generally designated 37, which includes a comparator 38 and a variable threshold resistor 39 connected between a fixed voltage (not shown) and to a second input of the comparator 38. The sample and hold circuit 21, doppler filter 36, and threshold circuit 37 operate in a fashion similar to that described for the sample and hold circuit 20, doppler filter 26, and threshold circuit 30.

The delayed gate from the delay circuit 35 activates the sample and hold circuit 21 so that a sample is taken of the signal from the video amplifier 16 each time the gate appears. The tracking gate is delayed by the delayed circuit 35 so that the leading edge of the tracking gate applied to the sample and hold circuit 21 occurs subsequent to the leading edge of the tracking gate applied to the sample and hold circuit 20, but generally prior to the trailing edge of the gate applied to the sample and hold circuit 20. In the present embodiment, for example, the second tracking gate is delayed a time equal to approximately one-half of the width of the first tracking gate. Doppler signals applied to the threshold circuit 37 which exceed the predetermined threshold set by the variable resistor 39 supply a signal or pulse to one input of an inhibit circuit 40. A second input of the inhibit circuit 40 is connected to the output of the first threshold circuit 30 and an output of the inhibit circuit 40 is connected to a second input (the up input) of the range counter 25. When a signal is prevelant at the output of the threshold circuit 30, the inhibit circuit 40 prevents the application of signals from the output of the threshold circuit 37 to the second input of the range counter 25. When no signals are present at the output of the threshold circuit 30 but signals are present at the output of the threshold circuit 37, these signals are applied to the second input of the range counter 25 to increase the range of the tracking gate provided by the range counter 25. Since the tracking gates applied to both sample and hold circuits 20 and 21 are generated from the range counter 25, an increase or decrease in range will affect both tracking gates.

FIG. 2(a), (b), (c) and (d) indicate the various conditions which the range tracking apparatus will experience as a reflected pulse appears at approximately the same range as the tracking gates. For convenience, the tracking gate applied to the sample and hold circuit 20 is referred to as an "early gate" and the tracking gate applied from the delay circuit 35 to the sample and hold circuit 21 is referred to as a "late gate". In FIG. 2(a) a reflected pulse has a greater range than either of the early or late gates. At this time, there is insufficient signal level in either gate position to develop an error signal at the output of the threshold circuits 30 or 37 and, therefore, both the early and late gates will remain stationery at there present range. If the target moves away from the radar the reflected pulse will move further out in range and will not be tracked. If the target moves toward the radar the following sequence of events will occur. In FIG. 2(b) the signal in the late gate channel (sample and hold circuit 21, doppler filter 36 and threshold circuit 37) has just overcome the threshold level set by the resistor 39 in the threshold circuit 37. This condition results in an error signal being gated to the range counter 25 to step the tracking gates out in range to meet the incoming pulse. This situation will continue until the signal in the early gate channel (sample and hold circuit 20, doppler filter 26, and threshold circuit 30) also exceeds the threshold set by the resistor 32 in the threshold circuit 30.

Figure 2:
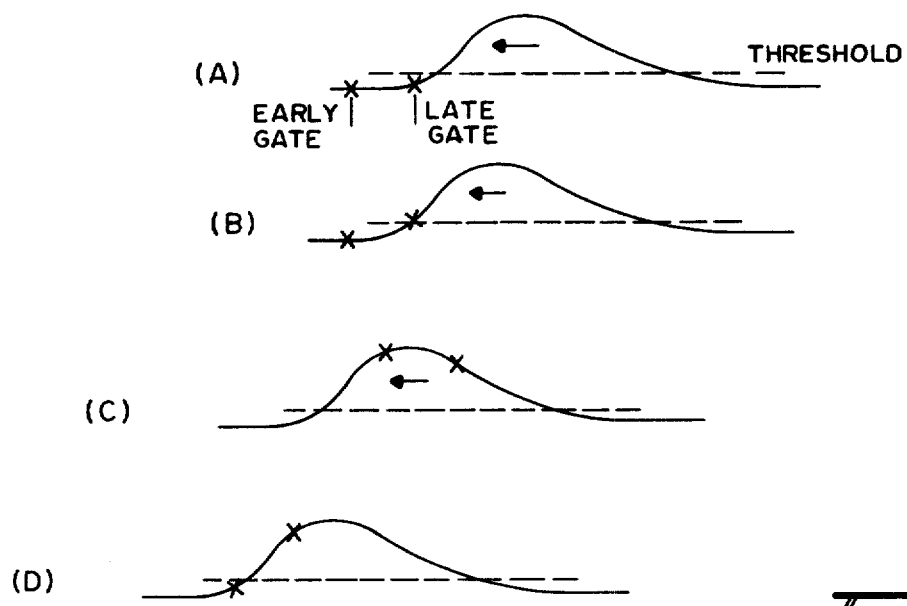

In FIG. 2(c) the signal level in the early gate channel has just crossed the threshold set by the resistor 32 in the threshold circuit 30. This condition causes the error signal from the early gate channel to assume control, that is, the output from the threshold circuit 30 will activate the inhibit circuit 40 to prevent the output from the threshold circuit 37 from reaching the range counter 25. Also, the error signal from the threshold circuit 30, or the early gate channel, causes the range counter 25 to step the tracking gates to the left in FIG. 2, or decrease the range, at a rate related to the doppler frequency. This condition will prevail until the position of the early gate moves along the leading edge of the reflected pulse to a point where the signal level in the early gate channel crosses below the threshold and the late gate channel again takes over as shown in FIG. 2(b). Thus, the early gate will effectively dither about the location of the threshold of the reflected pulse and accurately track the pulse as it progresses in either direction, once the threshold has been exceeded for either of the gates. The doppler signal frequency from the doppler filters 26 and 36 is directly proportional to the relative radial velocity between the moving target and the radar. Therefore, the signals from the comparators 31 and 38, which increase or decrease the range in the range counter 25, are produced at exactly the rate required to track the target. Further, the range counter 25 must move the tracking gate by an amount equal to or slightly greater than the radial distance change between the radar and the target which produced the doppler cycle otherwise the video pulse from the video amplifier 16 will move in range at a faster rate than the tracking gates and tracking will be lost. The amount, or step, that the tracking gates move for each doppler cyle, or each pulse applied to the range counter 25, must be equal to or greater than one half of the carrier wavelength.

The fact that the present apparatus always tracks on the leading edge of the reflected pulses allows rejection of multipath effects and enhances accuracy when tracking extended targets, because the apparatus is always tracking the nearest point. Because the apparatus does not require a sensitive servo loop it is capable of tracking targets that vary widely in range, velocity and acceleration and, further, the apparatus is relatively inexpensive and simple to manufacture.

I claim:

1. In a doppler radar having a transmitter for periodically transmitting pulses of electrical energy and a receiver for receiving reflected portions of energy of the transmitted pulses, range tracking apparatus comprising:

a. sample and hold means having a signal input, an output, and a gating input for causing said sample and hold means to sample a signal applied to the signal input when a gating signal is applied thereto;
b. threshold means having an input and an output and providing a signal at the output thereof only when a signal exceeding a predetermined threshold is applied to the input thereof, the output of said sample and hold means being coupled to the input of said threshold means;
c. range counter means, coupled to the radar for receiving a signal at the repetition rate of the transmitted pulses, for providing a gating pulse having a predetermined width a variable time after each pulse transmitted by the transmitter, said range counter means having an input coupled to the output of said threshold means for varying the time, that the gating pulse occurs after an associated transmitted pulse, by a predetermined fixed increment in response to each signal at the output of said threshold means; and
d. means coupling the gating pulse from the range counter means to the gating input of said sample and hold means.

2. Range tracking apparatus as claimed in claim 1 wherein the range counter means decrease the time, that the gating pulse occurs after an associated transmitted pulse, by a predetermined fixed increment in response to each signal at the output of the threshold means.

3. Range tracking apparatus as claimed in claim 1 wherein the range counter means includes an up/down counter.

4. Range tracking apparatus as claimed in claim 1 including in addition a low pass filter coupled between the output of the sample and hold means and the input of the threshold means.

5. Range tracking apparatus as claimed in claim 1 including in addition:
a. second sample and hold means having a signal input, an output and a gating input for causing said second sample and hold means to sample a signal applied to the signal input when a gating signal is applied thereto;
b. second threshold means having an input and an output and providing a signal at the output thereof only when a signal exceeding a predetermined threshold is applied to the input thereof, the output of said sample and hold means being coupled to the input of said threshold means;
c. said range counter means having a second input coupled to the output of said second threshold means for varying the time, that the gating pulse occurs after an associated transmitted pulse, by a predetermined fixed increment in response to each signal at the output of said second threshold means with no signal applied from the output of the first threshold means; and
d. means coupling the gating pulse from the range counter means to the gating input of said second sample and hold means.

6. Range tracking apparatus as claimed in claim 5 wherein the first threshold means is connected to the range counter means for decreasing the time, that the gating pulse occurs after an associated transmitted pulse, by a predetermined fixed increment in response to each signal at the output of the first threshold means and the second threshold means is connected to the range counter means for increasing the time, that the gating pulse occurs after an associated transmitted pulse, by a predetermined fixed increment in response to each signal at the output of the second threshold means with no signal applied from the output of the first threshold means.

7. Range tracking apparatus as claimed in claim 6 including in addition means connected to the output of the first threshold means and the second threshold means and the first input and second input of the range counter means for preventing a signal at the output of the second threshold means from reaching the second input of the range counter when a signal is present on the output of the first threshold means.

8. Range tracking apparatus as claimed in claim 7 wherein the means coupling the gating pulse from the range counter to the gating input of the second sample and hold means includes delay means for causing the gating pulse to be applied to the second sample and hold means later than the gating pulse applied to the first sample and hold means.

9. Range tracking apparatus as claimed in claim 8 wherein the delay means includes a delay of approximately one half the predetermined width of the gating pulse.

10. Range tracking apparatus as claimed in claim 5 including in addition first and second low pass filters coupled between the output of the first sample and hold means and the input of the first threshold means and between the output of the second sample and hold means and the input of the second threshold means, respectively.

11. Range tracking apparatus as claimed in claim 5 wherein the first and second threshold means each include a two input comparator with a voltage approximately equal to the predetermined threshold applied to one input of each of said first and second threshold means.

12. In conjunction with a doppler radar having a transmitter for periodically transmitting pulses of electrical energy and a receiver for receiving reflected portions of energy of the transmitted pulses, a method of range tracking comprising the steps of:
a. providing a doppler signal from received reflected portions of energy;
b. providing a variable range gate at a time subsequent to each transmitted pulse;
c. determining the amplitude of portions of the doppler signal occurring simultaneous with the range gate for each transmitted pulse; and
d. changing the amount of time the range gate occurs subsequent to an associated transmitted pulse by a predetermined fixed increment each time the portion of the doppler signal occurring during the range gate exceeds a predetermined value.

13. A method of range tracking as claimed in claim 12 including the steps of:
a. providing a second variable range gate delayed a fraction of the time of duration of the first range gate;
b. determining the amplitude of portions of the doppler signal occurring simultaneous with the second range gate for each transmitted pulse; and
c. decreasing the amount of time, that the first range gate occurs subsequent to an associated transmitted pulse, by a predetermined fixed increment each time a portion of the doppler signal occurring during the first range gate exceeds a predetermined value and increasing the amount of time, that the first range gate occurs subsequent to the associated transmitted pulse, by a predetermined fixed increment each time a portion of the doppler signal occurring during the second range gate exceeds a predetermined value and no portion of the doppler signal exceeds the predetermined value in the first range gate.

14. A method of range tracking as claimed in claim 13 including the steps of decreasing the amount of time, that the first range gate occurs subsequent to an associated transmitted pulse, by a predetermined fixed increment each time a portion of the doppler signal occurring during the first range gate exceeds the predetermined value even if a portion of the doppler signal occurring during the second range gate simultaneously exceeds the predetermined value.

15. Range tracking apparatus as claimed in claim 1 wherein the predetermined increment is approximately equal to one half of the carrier wavelength of the transmitted electrical energy.

* * * * *